United States Patent [19]

Woog

[11] 4,325,732
[45] Apr. 20, 1982

[54] PRECIOUS METAL RECOVERY CARTRIDGE AND METHOD

[76] Inventor: Manfred J. Woog, 1960 B St., Craig, Colo. 81625

[21] Appl. No.: 220,692

[22] Filed: Dec. 29, 1980

[51] Int. Cl.³ .............................................. C22B 11/04
[52] U.S. Cl. .................................. 75/109; 75/118 R; 75/118 P; 266/170; 210/497.01; 210/503; 210/504; 428/283
[58] Field of Search ............. 266/170; 75/109, 118 R, 75/118 P; 210/503, 505, 508, 504, 356, 282, 493.4, 497.01; 428/283

[56] References Cited

U.S. PATENT DOCUMENTS

| | | | |
|---|---|---|---|
| 1,617,353 | 2/1927 | Snelling | 75/109 |
| 2,068,263 | 1/1937 | Burhaus | 210/497.01 |
| 2,214,765 | 9/1940 | Holzwarth | 75/109 |
| 2,905,323 | 9/1959 | Megesi | 75/109 |
| 3,261,473 | 7/1966 | Riede | 210/282 |
| 3,327,859 | 6/1967 | Pall | 210/503 |
| 4,201,827 | 5/1980 | Heitkamp | 428/283 |
| 4,213,600 | 7/1980 | Thompson | 266/170 |
| 4,227,681 | 10/1980 | Golben | 266/170 |
| 4,250,172 | 2/1981 | Mutzenberg | 428/283 |
| 4,276,171 | 6/1981 | Jackson | 210/497.01 |
| 4,284,500 | 8/1981 | Keck | 210/497.01 |

*Primary Examiner*—Brian E. Hearn
*Attorney, Agent, or Firm*—Ancel W. Lewis, Jr.

[57] ABSTRACT

A cartridge housing (12) having a liquid inlet (14) at one end and an outlet (16) at the opposite end carries in an intermediate volume a spiral rolled exchange mass (18) of flexible, resilient, fibrous material forming a matrix that is self-supporting and non-reactive with the type of solutions with which the cartridge is intended to be used. Within the exchange mass is carried a dispersed array of finely divided particles of replacement metal (19), adhesively attached to the fibers. At each end of the cartridge adjacent to the inlet and outlet is a cavity (20) communicating with a spiral end (38) of the exchange mass, and the inlet cavity (20) houses an inlet nipple (26) that has a discharge opening (30) facing generally away from the spiral end face (38) of the mass. As flow through the mass produces precipitated precious metal, the mass is able to flex and thereby avoid clogging. Fiberglass is the preferred material for the exchange matrix. For some solutions a filter mass (21) is mounted in the same cartridge housing downstream of the exchange mass (18) to filter out selected products in solution.

22 Claims, 4 Drawing Figures

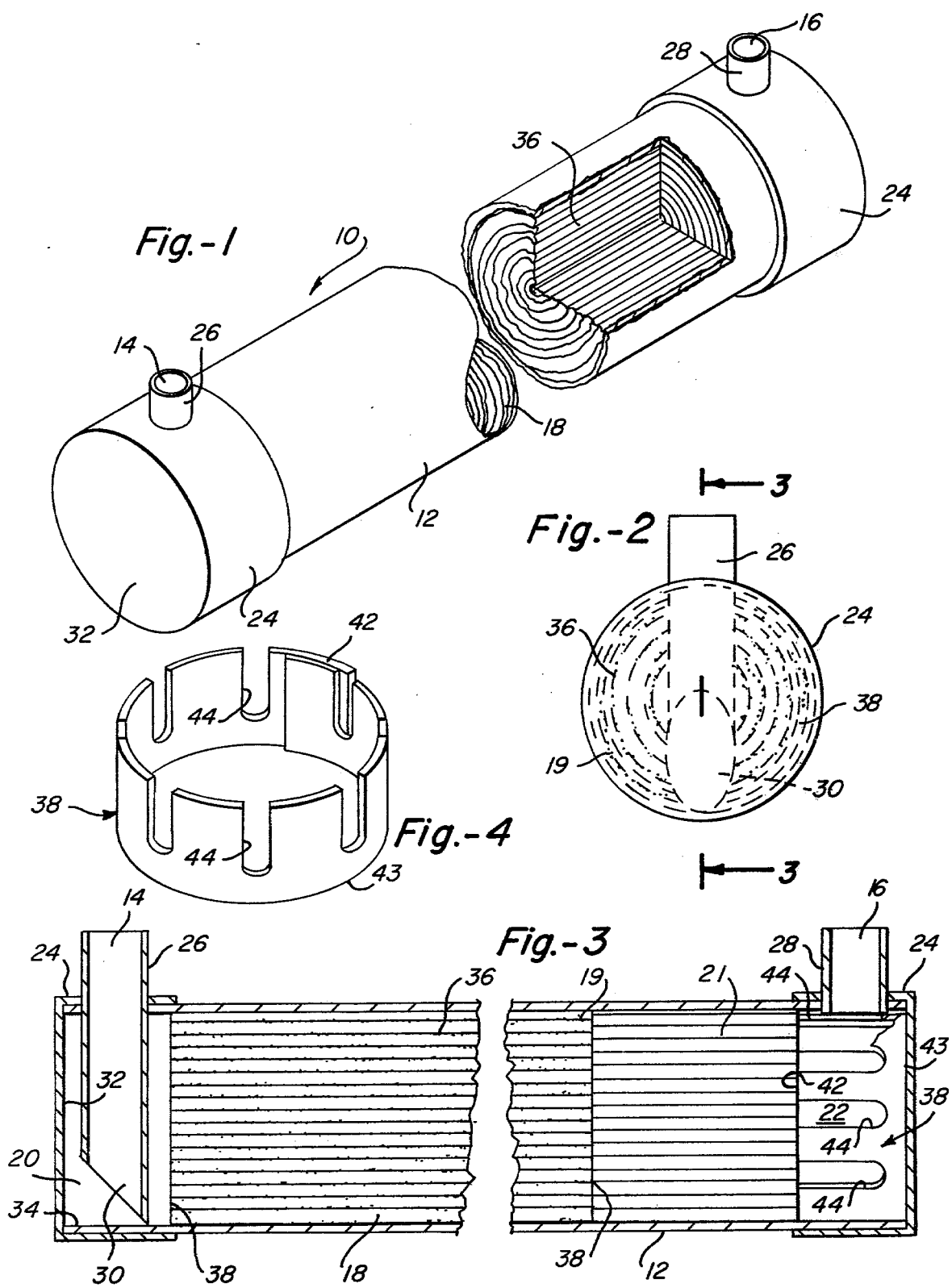

PRECIOUS METAL RECOVERY CARTRIDGE AND METHOD

TECHNICAL FIELD

This invention relates to metallurgy and metallurgical apparatus, especially to means for extracting metals by means precipitating metal from solution. The invention further relates to apparatus and method for recovery of silver as a precipitate from solution.

BACKGROUND ART

Precious metals and in particular silver may be found in solution from which recovery of the metal is desired. Silver is commonly dissolved in spent solutions of photographic fixer or waste hypo solution. Recovery is desired for the value of the silver as well as to prevent discharge of heavy metal as a pollutant into waste water systems.

A well accepted method of recovering silver or other precious metal is by replacement reaction wherein a metal higher in the electromotive force series that the metal to be recovered is contacted with the solution, causing the precious metal to be reduced and thereby come out of solution. The precious metal may be recovered as a sludge or precipitate or as a plating on the metal of higher electromotive force.

The replacement reaction concept has been embodied in numerous methods and types of equipment. Batch processing is known wherein silver-containing solution is mixed with powdered metal and agitated to produce a relatively complete reaction. Continuous flow processing is known wherein a silver-containing solution is passed through a bed or matrix of fine metal, with steel wool, scraps of screening, and even sections of automobile radiator cores having been used to supply the metal of higher electromotive force. Other apparatus has employed the replacement metal in more massive form such as in a grate, perforated plate, stack of spaced plates or in a metal cylinder about which the silver-containing solution is caused to circulate. Still other apparatus has employed a cylindrical roll of window screening in combination with a canister that directs the silver-containing solution radially through the roll, whereby the replacement metal is in a massive structure that maintains a reasonably large surface area per unit of volume.

Another proposed structure for the replacement metal is to use powdered metal dispersed on a suitable medium such as alumina or other porous inert substance, whereby the powdered metal has a large surface area for a high reaction rate while deriving support structure from the alumina.

The primary problems encountered with replacement reactions are incomplete reaction and clogging. Batch processing can overcome these problems, but this solution is inconvenient and may require considerable chemical skill in order to determine the approximate silver content of the batch and thereby enable the appropriate quantity of replacement metal to be added to the batch. Continuous flow processes utilizing a massive form of replacement metal tend to be both slow and inefficient, since the surface area of available replacement metal is quite small per unit of volume. If the massive elements are closely spaced, clogging can occur, while if the elements are more widely spaced, substantial portions of the silver-containing solution may pass through the elements without sufficient contact for good recovery of available silver. Fine metal beds are also susceptible to clogging by precipitated solids; and in the case of steel wool or the like, it has been observed that sections of the wool may be depleted by the replacement reaction, leaving flow channels where unreplaced silver solution can pass through the apparatus.

The silver precipitated in a replacement reaction may be recovered in a variety of ways. If the flow of hypo solution is by gravity and not particularly turbulent, the precipitate will settle out in the reaction vessel. More positive methods of recovery include the use of a filter to capture the silver metal. It has been proposed to place the replacement metal in a fabric bag so that the precipitate will be retained in the bag. Chemically inert fibrous pads have also been used as a filter at the outlet of a reaction vessel, with compressed fiberglass filaments having been used for this purpose. In at least one instance, it has been proposed to interleave layers of replacement metal with layers of filter material so that the replacement or exchange reaction takes place in one zone and the reaction product is accumulated in a physically separated second zone; and it has further been alleged that such an interleaved arrangement of zones is beneficial when different replacement metals are in respectively neighboring replacement metal zones. Thus, when a filter other than the replacement metal itself has been used, the filter has been located in a physically separated zone from the replacement metal.

While the use of filters can increase the yield of the silver recovery process and permit the use of pumps to rapidly circulate the silver-containing solution, the filter has remained in a position where it initially contacts the liquid at a zone interface where the natural tendency is for the face of the filter to accumulate the majority of the captured product and, accordingly, the filter is subject to clogging at the zone interface.

DISCLOSURE OF INVENTION

Apparatus employed for the recovery of precious metal by reaction with a replacement metal of higher electromotive force includes a housing having inlet and outlet means for, respectively, receipt and discharge of solution initially containing the precious metal, and an exchange mass carried in the housing at least between the inlet and outlet means, wherein the exchange mass is formed from a resilient fibrous material defining a structure capable of flexing resiliently under fluid pressure to prevent clogging by deposited precious metal. The exchange mass further includes finely divided particles of the replacement metal carried at dispersed locations throughout the fibrous structure.

Particularly for the recovery of silver, the fibrous structure is constructed from fiberglass and the replacement metal may be iron. Fiberglass in sheet form may be used as a compressed roll having opposite spiral faces, which faces are in communication with cavities adjacent the housing inlet and outlet means for receipt and discharge of the silver-containing solution into and out of the compressed roll. The inlet means may include a nipple having a discharge end oriented to circulate incoming solution away from the spiral roll face so that abrasion of the roll is avoided.

The method employed is to provide a fibrous mat and disperse the finely divided replacement metal particles over the surface of the roll, resulting in some of the particles penetrating into the mat. The particles are then adhesively attached to the mat and the mat is rolled into a spiral, wherein the thickness of the mat is reduced from one-half to one-thirtieth of the original thickness, thereby maintaining resiliency in the roll.

The spiral roll is impacted into a housing, and thereafter the solution to be processed is directed into the housing through inlet means communicating with one spiral end of the roll. As the solution passes through the roll, the replacement reaction substitutes replacement metal for the precious metal in solution, and the resulting solution is discharged from the housing through an outlet means.

The combination of an exchange mass followed by a filter mass in a single cartridge is a further feature of the present invention.

The primary object of the invention is to create apparatus and method for recovering silver and other precious metals from waste solutions by replacement reaction while eliminating the common tendency of equipment used for this purpose to clog and lose efficiency. This is achieved by creating a self-supporting matrix structure that carries the replacement metal particles within the apparatus housing. The structure provides an enduring environment through which the metal-bearing solutions are passed and encourages uniform flow through all parts of the apparatus. As the replacement reaction takes place and the precious metal precipitates, the matrix structure is capable of flexing to prevent clogging.

BRIEF DESCRIPTION OF DRAWINGS

The details of this invention will be described in connection with the accompanying drawings, in which:

FIG. 1 is an isometric view of the metal recovery cartridge with the center broken away and partially sectioned to show the exchange mass;

FIG. 2 is an inlet end view of the cartridge showing in broken lines the configuration of the inlet nipple and the spiral configuration of the exchange mass;

FIG. 3 is a cross-sectional view taken along the plane of line 3—3 of FIG. 2; and FIG. 4 is a perspective view of the spacer positioned in the outlet cavity of the apparatus of FIG. 3.

DETAILED DESCRIPTION

With reference to FIG. 1, the silver recovery cartridge 10 is defined by a cartridge housing 12 having an inlet 14 and an oulet 16. Between the inlet and outlet is a structured, resilient exchange mass 18 carrying an element 19 higher in the electromotive force series than silver, such that a replacement or exchange reaction will occur in the known manner when a solution having dissolved silver ions therein is passed through the mass, resulting in the precipitation of silver for retention in the mass. Immediately within the housing 12 adjacent to inlet 14 may be an inlet cavity 20, while a further outlet cavity 22 may be located within the housing immediately adjacent to outlet 16. The two cavities 20 and 22 provide, respectively, accumulation reservoirs for the solution entering and exiting the exchange mass.

A filter mass 21 is shown mounted in the housing 12 between the exchange mass and the cavity 22 which serves as a final filter following the exchange reaction. The filter mass 21 preferably filters out a free silver sulfide in solution for the further recovery of silver from the solution. While the use of the combination of both an exchange mass and a filter mass is shown and preferred for some applications when certain products in solution need to be filtered out before discharge, it is understood that when mechanical final filtering is not required the exchange mass will extend through the volume occupied by the filter mass.

Housing 12 is preferred to be cylindrical in shape and may be formed from a section of pipe, preferably constructed of a synthetic plastic material that is non-reactive or substantially inert to chemical reaction with silver ions or with the type of solutions commonly processed for recovery of silver. Polyvinylchloride (PVC) pipe has been found to be suitable for most applications, is readily available, and inexpensive, permitting the housing to be disposable. The pipe ends are closed by PVC plastic caps 24 that engage the opposite open ends of the pipe. Although the caps may be attached by threads, solvent welding is the preferred method of attachment in order to form a leak-proof seal. After the pipe ends have been closed by the caps 24, the inlet and outlet are formed by radially drilling through the cap sidewall and pipe wall to form inlet and outlet openings, and inlet and outlet nipples 26 and 28, respectively, are then inserted through such openings and solvent welded in place.

The resilient exchange mass 18 is carried in the pipe between the opposite ends and spaced from each end by a sufficient distance to permit the nipple 26 to terminate inside the housing in cavity 20. For uniformity of assembly, the combination of the exchange mass and filter mass may have a length approximately equal to the longitudinal distance between the end caps and be centrally carried in the housing, thereby causing the two cavities to be defined within the portions of the pipe contained within the caps. The nipples 26 and 28 are then assured of entering suitable cavities regardless of their exact position of insertion through the cap sidewalls.

Nipple 26, serving as the inlet means, is formed at its interior end 30 to direct incoming fluids away from the exchange mass so that there will be no tendency to erode a channel in the mass from the force of the moving fluid and also to encourage a uniform fluid pressure against the mass form cavity 20. As best shown in FIGS. 2 and 3, nipple 26 may be beveled or otherwise angled at end 30 to discharge liquid generally in the direction of the cap end wall 32 or the intersection of the end wall and pipe sidewall 34, thereby causing the cavity walls to become reflecting walls to diffuse the liquid to all parts of the cavity. For this purpose, the nipple 26 extends across the majority of the cavity diameter and may contact the opposite side of housing 12.

Outlet nipple 28 is not required to prevent erosion of the exchange mass and the inner end terminates approximately flush with the inside surface of the housing to prevent an air lock when the cartridge is disposed in the horizontal position.

The exchange mass 18 and filter mass 21 are best shown in FIGS. 2 and 3 to occupy the full diameter of the housing 12 in the area between the cavities 20 and 22. The exchange mass 18 provides a support structure for carrying a randomly dispersed array of the replacement element in finely divided form for exchange with the silver from solution, while at the same time filtering the precipitated silver from the solution and retaining it for later recovery.

Although both exchange and recovery of silver take place at almost identical locations, clogging is prevented by resilience of the mass, whereby the mass can flex and compress or expand in a sponge-like manner when silver deposits cause too great a fluid pressure drop across the mass, as when precipitates have closed flow paths in the mass. The ability of the exchange mass to flex resiliently has been found to prevent clogging and maintain good flow rates.

The exchange mass for silver recovery is preferred to be formed from a fiberglass mat coated on at least one side with a replacement metal such as iron and rolled into a tight spiral 36. The mat may have a width equal to the desired length of the mass in the housing, since fiberglass mats do not substantially spread when under modest compression. The fibers in the mat lie generally in the plane of the mat to form a loose weave.

Mat thickness is determined by the density of the fiberglass and the desired degree of uniformity with which the powdered replacement metal is dispersed. A relatively dense mat will retain more powdered metal 19 on its surface, while a less dense mat will permit greater metal penetration into the mat thickness. A more dense mat is also more difficult to compress in the spiral and this will result in a greater thickness of fiberglass per wrap of the spiral. An exchange mass furnished by Owens Corning having fibers made in diameters of about 0.762 cm has been found suitable for this purpose.

The exchange mass is formed by sprinkling powdered replacement metal 19 on the surface and into the fiberglass mat and bonding the iron to the mat with a spray adhesive. Thereafter, the mat is rolled lengthwise into a tight spiral 36 in which the mat thickness is reduced by compression to between one-half and one-thirtieth of the original, nominal thickness of the mat. The cylindrical spiral thus formed is impacted into the cylindrical housing. The result is a self-supporting resilient matrix of fiberglass carrying iron powder 19 or other replacement metal, alone or in combination, in substantially uniform distribution throughout the radius and length of the rolled exchange element.

The uniformity of the distribution is assured by, first, the spiral wrapping of the mat, which locates a corresponding spiral pattern of iron powder throughout the radius of the cylindrical roll regardless of whether the metal powder has penetrated the mat; and, second, by the penetration of the powdered metal into the mat, resulting in distribution of replacement metal between spiral layers. The mat fibers, originally generally planar, now follow the wraps of the spiral pattern and help to define flow paths closely intermingled with the distributed iron powder. The axis of the spiral roll is parallel to the longitudinal axis of the housing cylinder 12, such that the spiral ends 38 of the roll face the cavities 20 and 22.

In addition to having the ability to flex and thereby prevent clogging, the fiberglass support structure encourages uniform flow of the silver-containing solution through the entire exchange mass for exposure of all contained iron powder to the solution. Because the fiberglass is inert to the type of solutions typically processed for silver recovery, the support structure does not change significantly in character as the iron powder is consumed. The fiber structure of the fiberglass is unaltered by the chemical exchange and thus prevents flow channels from forming to favor any area of the mass. A further advantage of employing fiberglass is realized during silver recovery, which is by smelting. The silica of the fiberglass serves as a flux for separating the silver from other elements that may have been deposited in the exchange mass.

The filter mass 21 may also be a fiberglass mat wrapped in a spiral shaped in a cylindrical roll and is installed in a compressed condition as is exchange mass 18. The filter mass may also take the form of a circular pad and may be of a polyester mat material like a pillow filler.

Since the filter mass 21 is relatively short in length in the housing 12 and is subjected to fluid flow and hydraulic pressure, a spacer 38 is provided in the outlet cavity 22 to hold the filter mass in place. This spacer 38 shown is in the form of a flat strip of non-reactive plastic material such as PVC having opposed side edges 42 and 43 with a plurality of U-shaped slots 44 opening through the upstream side edge 42. The spacer 38 is curled along its length to form a single-turn coil with overlapping end portions. In place as shown in FIG. 3, side edge 42 bears against the filter mass 21 and side edge 43 agaist end cap 24. The open central area and slots in spacer 38 provide a flow path for the solution to pass through the outlet 16.

In a specific example of the construction and use of the silver recovery cartridge, the exchange mass is constructed from a mat of fiberglass having nominal dimensions of 47.59 cm width, 243.84 cm length, and 5.08 cm thickness. The mat is sprinkled with between approximately 1.3 kilograms and 2.8 kilograms of powdered iron (approximately 0.01524 cm to 0.0254 cm, 40 mesh), which is bonded to the fiberglass with a spray adhesive known as #77 adhesive manufactured by the 3M Company. The mat is then rolled along its major dimension into a tight spiral having, for example, fifteen wraps, and subsequently impacted into a PVC drain pipe having a 10.6 cm diameter and 60.96 cm length, the roll being centered to leave an empty area at each end of the pipe for 5.08 cm. Each layer of the spiral is thus compressed to approximately one-eighth of the nominal mat thickness. The final filter mass 21 found suitable has a fiber size and density to filter as small as 5 micron size particles.

Each open end of the pipe is subsequently sealed by a PVC cap having 5.08 cm depth, which is solvent welded to the pipe. At the center of each cap's length, the cap is drilled with a 1.27 cm diameter hole. Into one hole, designated the inlet, a 12.1 cm length of PVC pipe of 1.27 cm diameter is inserted and solvent welded in place, leaving 1.9 cm protruding as the exterior nipple for attachment of a supply line, while 10.2 cm of pipe is inside the housing The inner end of the inlet pipe is equippd with a 45-degree bevel. The hole in the opposite end cap receives a 3.81 cm length of 1.27 cm diameter pipe, 1.9 cm of which remains protruding as the exterior nipple for connection of a drain hose. This nipple is also solvent welded in place.

At the point of use, the inlet and outlet nipples are connected to supply and drain lines, as indicated above, and the silver recovery cartridge is immediately prepared for operation. The silver-containing solution passes through the cartridge with uniform flow and the silver precipitates by replacement reaction with the powdered iron. The precipitate is retained in the fiberglass exchange mass, which flexes to accommodate the build-up and thereby prevents clogging. The cartridge is operable in either the horizontal position or in a vertical position with the outlet 16 at the top. The cartridges may be used in series or parallel as required by the volume of solution to be processed and the degree of silver removal desired. The final filter mass 21 in the same cartridge housing following the exchange mass is particularly suitable for applications where a tail cartridge is required following an electrolytic process.

Periodically, a cartridge is removed and replaced with a fresh unit. The spent cartridge is sent to a smelter, where the entire cartridge is subjected to high heat, causing the fiberglass to melt and serve as a flux to aid in separation and recovery of the silver metal.

INDUSTRIAL APPLICABILITY

The silver recovery cartridge is useful for removing silver metal dissolved in processing solutions commonly employed in photographic and X-ray film development. Waste hypo solutions, commonly consisting of thiosulfates, otherwise carry dissolved silver into waste water disposal systems, resulting in both loss of the silver and heavy metal contamination of the water.

Although the present invention has been described with a certain degree of particularity, it is understood that the present disclosure has been made by way of example and that changes in details of structure may be made without departing from the spirit thereof.

What is claimed is:

1. An apparatus for the recovery of a metal in a recovery-metal bearing solution by reaction with a replacement metal of higher electromotive force, comprising;
    a housing having inlet and outlet means spaced apart thereon; and
    an exchange mass carried in said housing at least between said inlet and outlet means, wherein said exchange mass comprises a resilient fibrous support structure in generally spiral configuration and capable of flexing under fluid pressure to prevent clogging by deposited recovered metal, and a plurality of finely divided particles of replacement metal carried in dispersed relationship within said support structure and generally following the spiral configuration of the support structure;
    wherein said housing defines an inlet cavity immediately adjacent to said inlet means at a first axial end of the housing and further defines an outlet cavity immediately adjacent to said outlet means at a second and opposite axial end of said housing, and wherein said exchange mass is carried within the housing between said inlet and outlet cavities with the axis of said spiral support structure substantially parallel with the axis of the housing, whereby, in use, flow of recovery-metal bearing solution between said inlet and outlet cavities is in a flow path substantially entirely parallel to said spiral layers of support structure and replacement metal particles for exposure of replacement metal to recovery-metal bearing solution substantially continuously, and, whereby, said support structure is capable of resilient flexing in response to obstruction of said flow path.

2. The apparatus according to claim 1 wherein said particles are adhesively attached to said support structures substantially through all turns of the spiral and substantially through uniformly between axial ends thereof.

3. An apparatus according to claim 1 including a filter mass disposed in said housing between said exchange mass and said outlet means for filter-out selected products in solution after the solution passes through said exchange mass, and further including spacing means disposed in the outlet cavity between said filter mass and an end wall of the housing adjacent said outlet opening.

4. An apparatus according to claim 1 wherein said support structure comprises fiberglass.

5. An apparatus according to claim 1 wherein said support structure comprises a spiral of fiberglass.

6. An apparatus according to claim 1, further comprising adhesive means maintaining said finely divided particles in said dispersed relationship within the support structure.

7. An apparatus according to claim 1 wherein the recovery metal comprises silver, the replacement metal comprises iron, and the fibrous support structure comprises fiberglass.

8. An apparatus according to claim 1 wherein said inlet means comprises a nipple connected to said housing, extending into the inlet cavity, and forming within the inlet cavity an outlet opening directed substantially away from the exchange mass.

9. An apparatus according to claim 8 wherein said inlet nipple comprises at its outlet opening a beveled nipple end.

10. An apparatus according to claim 1 wherein said inlet means comprises an inlet nipple connected to said housing, extending into the inlet cavity, and having a terminal end beveled to form an outlet opening at least partially facing the housing cylinder end wall opposite from the exchange mass in the inlet cavity.

11. An apparatus according to claim 10 wherein said inlet nipple extends substantially diametrically across the housing cylinder.

12. An apparatus according to claim 1 including a filter mass disposed in said housing between said exchange mass and said outlet means for filtering out selected products in solution after the solution passes through said exchange mass.

13. An apparatus according to claim 12 wherein one of said selected products is free silver sulfide.

14. An apparatus according to claim 12 wherein said filter mass comprises a fibrous support structure.

15. An apparatus according to claim 14 wherein said filter mass comprises a spiral of fiberglass.

16. An apparatus according to claim 14 wherein said filter mass comprises is a polyester fiber mat.

17. An apparatus according to claim 1 wherein said exchange mass is elastically compressed within said housing along at least one dimension.

18. The method of recovering a metal from a recovery metal-containing solution, comprising:
    providing a mat of resilient fibrous material;
    dispersing finely divided particles of a replacement metal over the surface of said mat, wherein the replacement metal is higher in the electromotive force series than the recovery metal;
    adhesively attaching said particles to the mat;
    rolling said mat into a spiral;
    inserting said spiral roll into a housing having an inlet communicating with one axial end of the spiral roll and an outlet communicating with the second axial end of the spiral roll;
    directing a recovery metal-containing solution into the housing through said inlet for axial passage through the spiral roll and replacement reaction recovery of recovery metal by exchange with said replacement metal particles; and
    discharging the resultant solution from said outlet.

19. The method according to claim 18 wherein said mat defines a plane, the general direction of orientation of the majority of mat fibers lying substantially in said plane.

20. The method according to claim 19 wherein the thickness of the mat is resiliently compressed by said rolling to between one-half and one-thirtieth of its unrolled thickness.

21. A method according to claim 18 including the further step of filtering out selected products in solution after the solution passes through said mat.

22. The method of claim 18, wherein the recovery metal comprises silver.

* * * * *